United States Patent [19]

Ohashi

[11] Patent Number: 5,075,802
[45] Date of Patent: Dec. 24, 1991

[54] IMAGE SIGNAL RECORDING AND REPRODUCING SYSTEM

[75] Inventor: Kazuhito Ohashi, Kanagawa, Japan

[73] Assignee: Canon Kabushiki Kaisha, Tokyo, Japan

[21] Appl. No.: 460,308

[22] Filed: Jan. 3, 1990

[30] Foreign Application Priority Data

Jan. 12, 1989 [JP] Japan ................................. 1-003734

[51] Int. Cl.⁵ ........................ G11B 5/02; H04N 9/79; H04N 5/76
[52] U.S. Cl. ..................................... 360/27; 358/310; 358/335
[58] Field of Search ................ 360/27, 28, 36.1, 36.2; 358/310, 320, 321, 322

[56]   References Cited
U.S. PATENT DOCUMENTS 4,286,281 8/1981 Suzuki ................................. 358/319
4,768,103 8/1988 Nakamura et al. ................. 358/321

Primary Examiner—Aristotelis Psitos
Assistant Examiner—Varsha V. Sheladia
Attorney, Agent, or Firm—Robin, Blecker, Daley & Driscoll

[57] ABSTRACT

An image signal recording and reproducing system of this invention includes an apparatus for reproducing an image signal from a recording medium on which the image signal is recorded in a recording format selected between a first recording format for recording a reference signal for time base correction together with the image signal and a second recording format for recording the image signal without the reference signal for time base correction. The apparatus is arranged to detect whether or not the reference signal for time base correction is present in a signal reproduced from the recording medium and then to process and reproduce the signal reproduced from the recording medium on the basis of a reproduction format selected between a first reproduction format corresponding to the first recording format and a second reproduction format corresponding to the second recording format in accordance with the detection result. Accordingly, it is possible to reproduce the image signal in a correct format corresponding to the recording format of the image signal.

5 Claims, 18 Drawing Sheets

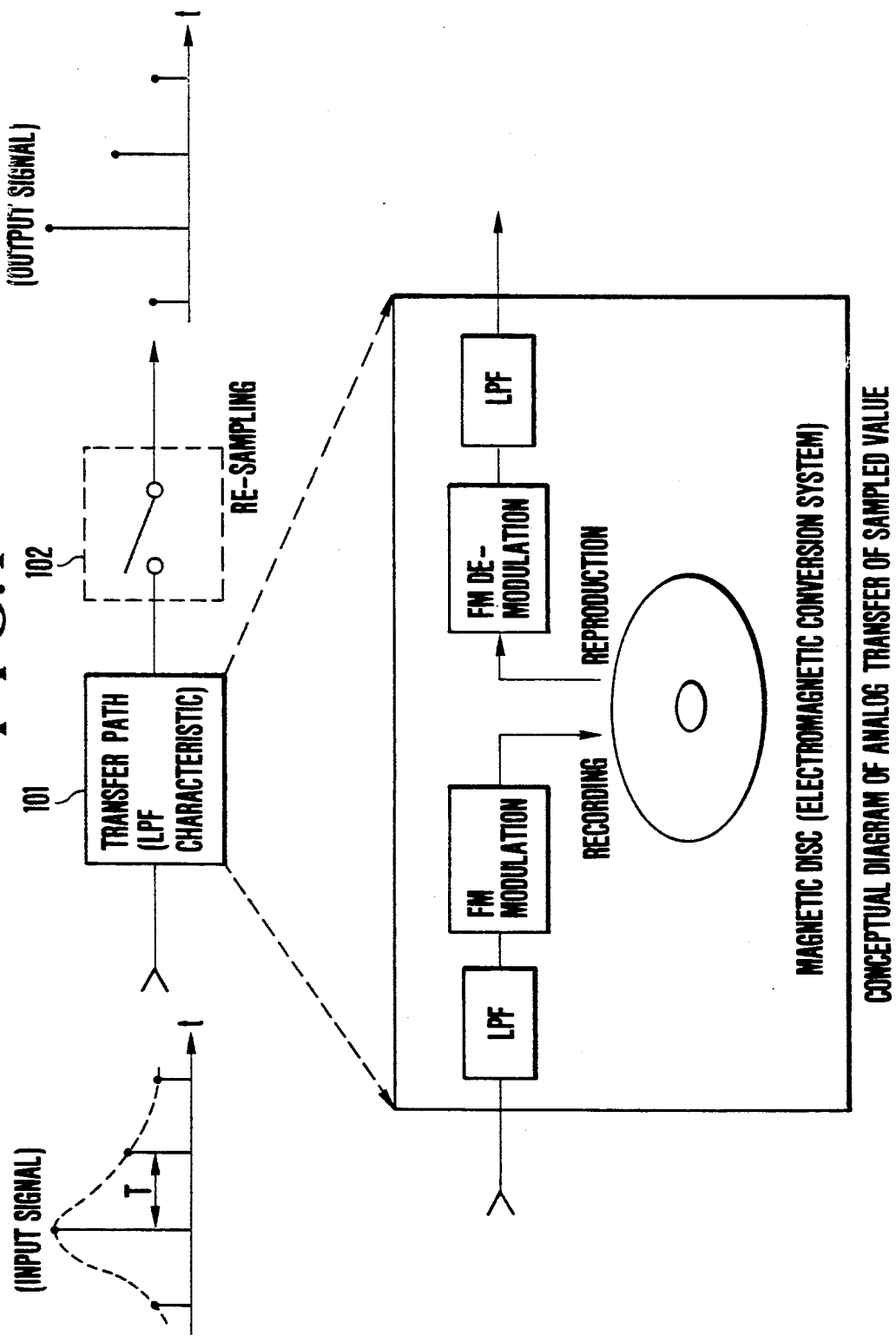

FIG. 2(a) INPUT SIGNAL
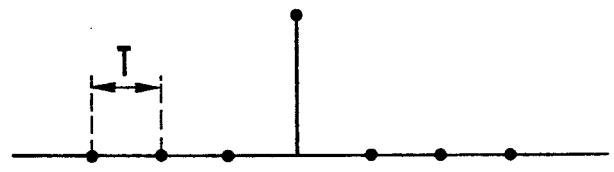
FIG. 2(b) TRANSFER-PATH OUTPUT SIGNAL
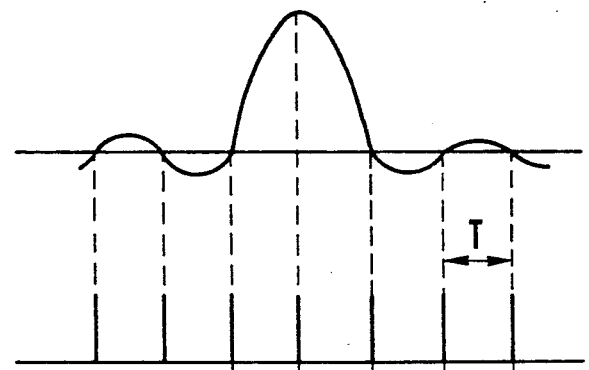
FIG. 2(c) RE-SAMPLING PULSES
FIG. 2(d) OUTPUT SIGNAL (RE-SAMPLED OUTPUT)
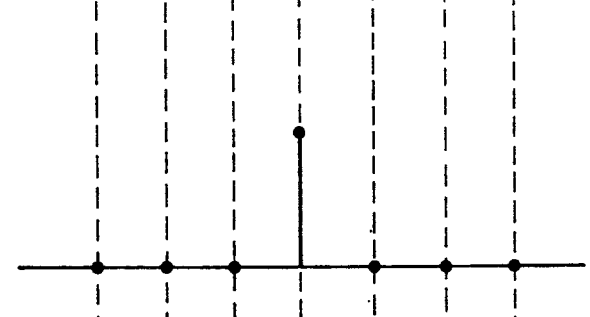
FIG. 2(e) RE-SAMPLING PULSES OUT OF PHASE
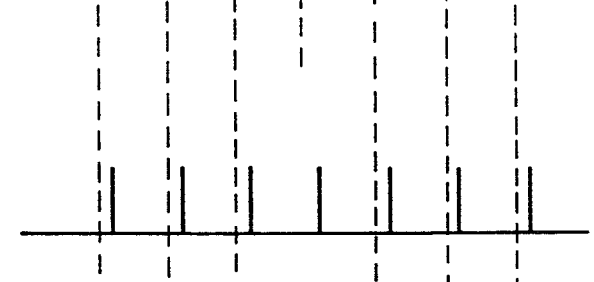
FIG. 2(f) RE-SAMPLED OUTPUT CORRESPONDING TO FIG. 2(e)
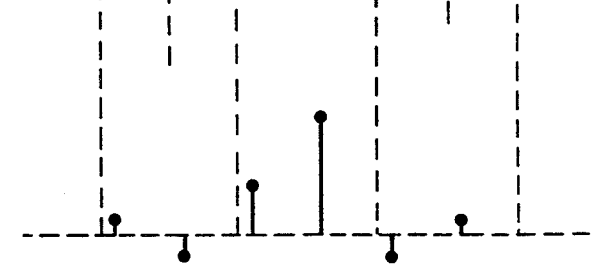
PRINCIPLE OF ANALOG TRANSFER OF SAMPLED VALUE

TRANSFER-PATH LPF CHARACTERISTIC OF ANALOG TRANSFER OF SAMPLED VALUE

FREQUENCY ALLOCATION OF RECORDED SIGNAL BASED ON SV FORMAT

FIG.4
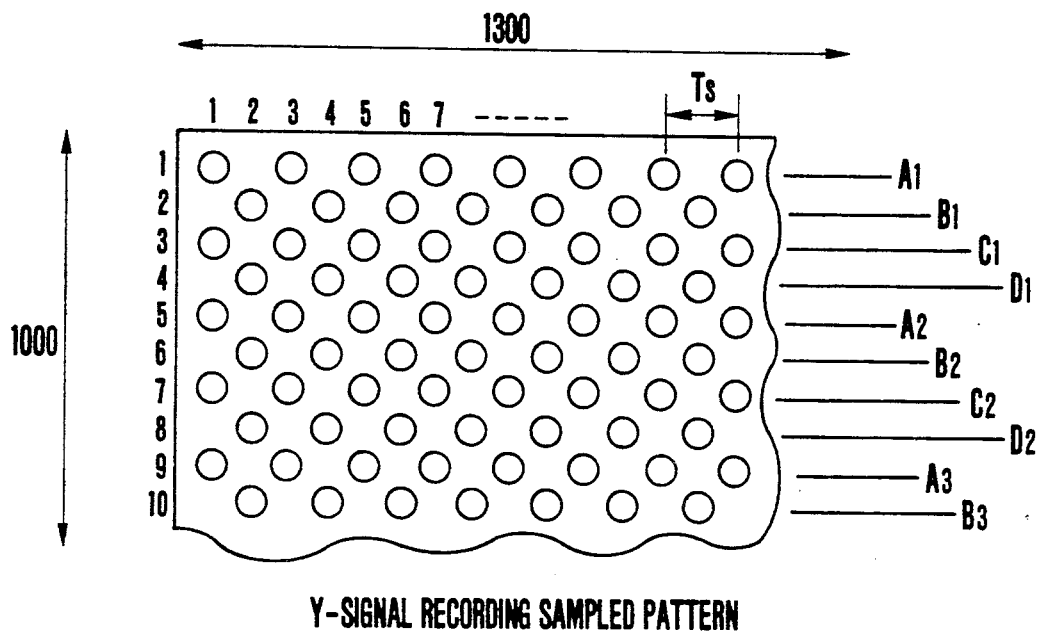
Y-SIGNAL RECORDING SAMPLED PATTERN
FIG.6(a)   FIG.6(b)
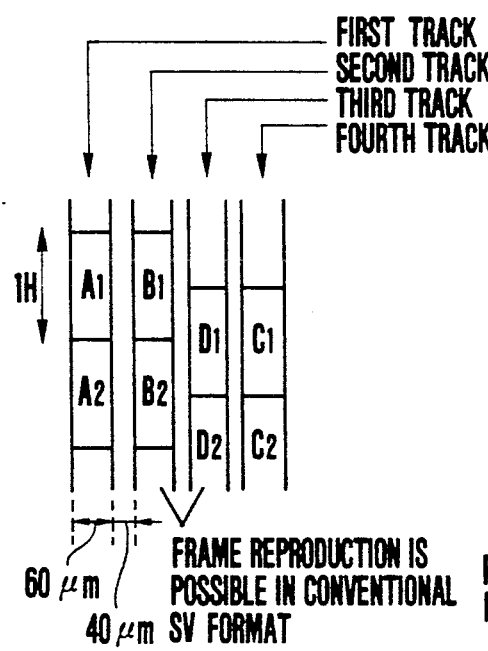 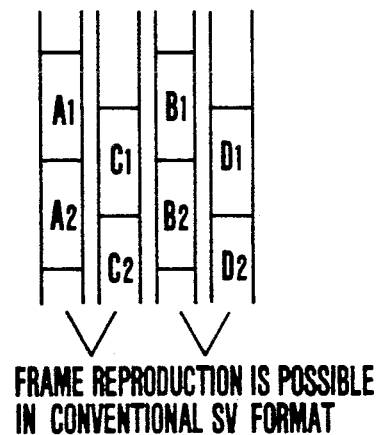
RECORDING TRACK PATTERN

RECORDING SAMPLED PATTERN FOR Y SIGNAL AND C SIGNAL

FIG.8

|  | FIRST STEP (FIRST CYCLE OF SIMULTANEOUS 2-CH RECORDING) | SECOND STEP (SECOND CYCLE OF SIMULTANEOUS 2-CH RECORDING) |
|---|---|---|
| RECORDING TRACK | TRACKS 1 AND 2 | TRACKS 4 AND 3 |
| RECORDING SIGNAL | (TRACK 1) <br> $\begin{bmatrix} Y(A_i) \\ C_R(A_i)/C_B(B_i) \end{bmatrix}$ <br> (TRACK 2) <br> $\begin{bmatrix} Y(B_i) \\ C_B(B_i)/C_R(A_i) \end{bmatrix}$ | (TRACK 3) <br> $\begin{bmatrix} Y(D_i) \\ C_B(D_i)/C_R(C_i) \end{bmatrix}$ <br> (TRACK 4) <br> $\begin{bmatrix} Y(D_i) \\ C_R(C_i)/C_B(D_i) \end{bmatrix}$ |
| IMAGING SECTION OUTPUT $(Y_1, Y_2, R, B)$ | $Y_1=Y(A_i)$ <br> $Y_2=Y(B_i)$ <br> $R=R(A_i)$ <br> $B=B(B_i)$ | $Y_1=Y(D_i)$ <br> $Y_2=Y(C_i)$ <br> $R=R(C_i)$ <br> $B=B(D_i)$ |

WHERE 
$\begin{cases} Y(*): Y \text{ SIGNAL ON LINE } * \\ C_R(*): C_R \text{ SIGNAL ON LINE } * \\ C_B(*): C_B \text{ SIGNAL ON LINE } * \\ R(*): R \text{ SIGNAL ON LINE } * \\ B(*): B \text{ SIGNAL ON LINE } * \end{cases}$

FIG.13

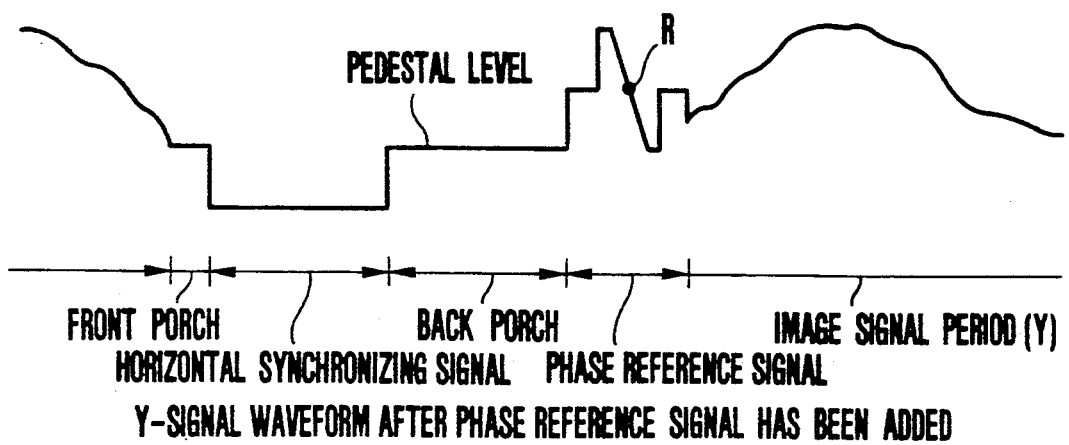

FRONT PORCH    BACK PORCH    IMAGE SIGNAL PERIOD (Y)
HORIZONTAL SYNCHRONIZING SIGNAL    PHASE REFERENCE SIGNAL
Y-SIGNAL WAVEFORM AFTER PHASE REFERENCE SIGNAL HAS BEEN ADDED

EXAMPLE OF THE ARRANGEMENT OF COLOR FILTERS

IMAGING SECTION

CONSTRUCTION OF PLL CKT

Y-SIGNAL RE-SAMPLING CLOCK PHASE CONTROL CKT

OPERATIONAL TIMING CHART OF Y-SIGNAL RE-SAMPLING CLOCK PHASE CONTROL SIGNAL GENERATING CKT

VARIABLE DELAY CKT

C-SIGNAL DELAY CONTROL SIGNAL GENERATING CKT

IMAGE SIGNAL RECORDING AND REPRODUCING SYSTEM

BACKGROUND OF THE INVENTION

1. Field of the Invention

The present invention relates to an image signal recording and reproducing system for recording an image signal on a recording medium and for reproducing the image signal recorded on the recording medium.

2. Description of the Related Art

Still video (SV) systems are known as one type of apparatus for recording and reproducing still image signals. The SV systems are arranged to record TV signals based on the current television signal format on 2-inch magnetic discs by utilizing frequency modulation. However, the resolution attained with such a system is limited by that of the current TV system. For this reason, it is pointed out that, if a printer is used to produce a printout as the final output from a still image recorded by such an SV system, the obtained image quality (particularly, the resolution) will be low compared to that of a typical silver-halide photograph.

It is also known that several novel television systems such as a high-definition television (HDTV) system have recently been proposed. The HDTV system is characterized by about one thousand scanning lines which have about twice the number of scanning lines used in the current HTSC system, and is also provided with a corresponding horizontal signal band. Accordingly, it has been strongly desired to develop a still image recording and reproducing system capable of recording and reproducing a still image signal which compares with the image quality of 1,000×1,000 pixels (per square image area on a TV screen) realized by the HDTV system or the like.

In light of such a situation, the SV systems adopt high-band (wide-band) recording formats to effect recording and reproduction on and from recording media.

However, it is desired that an improvement in the image quality of the SV systems be achieved while compatibility with the conventional format is being maintained.

One method of improving the image quality while maintaining compatibility with the conventional format is the CHSV (compatible high definition SV) system which was proposed by the applicant of the present invention.

The following is an explanation of the CHSV system proposed by the present applicant.

The CHSV system utilizes an art called analog transfer of sampled values.

A system for analog transfer of sampled values is, as shown in FIG. 1, characterized by transfer-path characteristics (LPF characteristics) and re-sampling. More specifically, the system is arranged to pass the input sampled value through a frequency-modulation section, an electromagnetic conversion section and a frequency-demodulation section and then to restore the sampled value by re-sampling.

The principle of the analog transfer of sampled values is explained in more detail with reference to FIGS. 2(a) to 2(f). In the following explanation, it is assumed that a sequence of sampled values of period T, shown in FIG. 2(a), is recorded and reproduced. The transfer path shown in FIG. 1, which includes the frequency modulation section, the electromagnetic conversion section and the frequency demodulation section, has a low-band transmission characteristic, i.e., a low-pass filter (LPF) characteristic. FIG. 2(b) shows the output of this transfer path. The illustrated transfer-path output is re-sampled with a sequence of re-sampling pulses of period T and in correct phase, such as that shown in FIG. 2(c), to provide the signal shown in FIG. 2(d). As can be seen from FIG. 2(d), the sequence of input sampled values is correctly reproduced (transferred). However, if the re-sampling pulses are out of phase as shown in FIG. 2(e), the sequence of sampled values is not correctly reproduced (transferred), resulting in ringing such as that shown in FIG. 2(f). Accordingly, to accomplish the above analog transfer of sampled values, during reproduction (on the receiving side) it is necessary to generate a sequence of re-sampling pulses of correct frequency (period), corresponding to the reproduced (received) sampled-value signals, and it is also necessary that a sequence of re-sampling pulses of correct phase corresponding to the reproduced (received) sampled-value signals be generated. The other requirement for completely transferring sampled-value signals is as follows: the transfer path, including the frequency modulation and demodulation sections and the electromagnetic conversion section, has a linear phase and a frequency characteristic which exhibits symmetrical roll-off centered at a sampling frequency $f_s(=\frac{1}{2}T)$.

More specifically, it is necessary that the transfer path have an LPF characteristic such as that shown in FIG. 3. The outline of the analog transfer of sampled values has been explained.

The following is an explanation of a method of recording the chrominance (Y) signal on the basis of the CHSV system.

FIG. 4 is a diagram showing sample points for a Y signal to be recorded on a magnetic disc. As shown in FIG. 4, the sample points for the Y signal are arranged in offset form for the purpose of subsampling transfer. Also, 650 (1300/2) sample points are in a row and 500(1000/2) sample points are in a column. The sampled values contained in rows $A_1$, $A_2$, ... are recorded on a single track on the magnetic disc, the sampled values contained in rows $B_1$, $B_2$, ... on another track, and so on. In this manner, the signals indicating all the sample points are recorded on a total of four tracks.

The sample points are recorded on each track in a format according to a known SV format. FIG. 5 shows the frequency allocation of a signal recorded in the SV format. As shown in FIG. 5, in the SV format, the basebands of recorded Y and C signals are 7 MHz or less and 1 MHz or less, respectively.

In FIG. 4, each row includes 650 Y-signal sample points, and these points are recorded within the horizontal effective frame period (53 μsec or less) of a NTSC-TV signal. Accordingly, the corresponding sampling frequency $f_s$(refer to FIG. 3) is 6.1 MHz or less. In the above-described manner, the Y signal having a band such as that shown in FIG. 3 is recorded.

FIGS. 6(a) and 6(b) show two different recording patterns formed on the magnetic disc on the basis of the CHSV system. FIG. 6(a) shows the recording pattern formed when a 2-channel (2-ch) head is utilized, while FIG. 6(b) shows the recording pattern formed when a 4-channel (4-ch) head is utilized. (Needless to say, the 4-ch head can be utilized to form either of the recording patterns shown in FIGS. 6(a) and 6(b).)

The recording pattern of FIG. 6(a) is formed as follows. First, the sampled values of the Y signal on the row $A_i$ and the row $B_i$ (i=a positive integer), i.e., the sampled values for two channels, are simultaneously recorded on the first and second tracks, respectively, by means of the 2-ch head. Then, the 2-ch head is moved to the third and fourth tracks (this movement is not needed when a 4-ch head is in use), and the sampled values of the Y signals on the row $D_i$ and the row $C_i$, i.e., the sampled values for two channels, are simultaneously recorded. During this time, as illustrated, in order to maintain compatibility with the conventional SV format, the positional relationship between the tracks for recording the sampled values of the Y signal on the rows $D_i$ and $C_i$ are reversed.

In general, simultaneous 2-ch recording involves the problem of crosstalk arising between signals in a head during recording. However, the use of the recording method described above makes it possible to solve such problem since well-known H alignment is effected between two heads during simultaneous recording.

Where a 4-ch head is utilized, recording may be performed in accordance with the recording pattern shown in FIG. 6(b). More specifically, the sampled values of the Y signal on the row $A_i$ and the row $B_i$, i.e., the sampled values for two channels, are simultaneously recorded on the first and third tracks, respectively. Then, the sampled values of the Y signals on the row $C_i$ and the row $D_i$, i.e., the sampled values for two channels, are simultaneously recorded on the second and fourth tracks, respectively.

With the above-described recording method, in the case of the recording pattern of FIG. 6(a), it is possible to reproduce a frame image based on the conventional SV format from the second and third tracks. As for the recording pattern of FIG. 6(b), it is possible to reproduce a frame image based on the conventional SV format from the first and second tracks or the third and fourth tracks.

The process of recording a Y signal in the CHSV system is as described above.

The following is an explanation of the process of recording the color-difference line-sequential (C) signal in the CHSV system.

FIGS. 7(a), 7(b) and 7(c) show the relationship between the recording sample patterns of a Y signal, a $C_R$ (R-Y) signal and a $C_B$(B-Y) signal. In the conventional SV format, a recording band allocated for a color-difference signal is about 1/6 that of the Y signal, and the color-difference signal is recorded in a line-sequential manner. Accordingly, the sample patterns of the color-difference signals $C_R$ and $C_B$ in the CHSV system are as shown in FIGS. 7(b) and 7(c), respectively. In the right-hand side of each of FIGS. 7(b) and 7(c), lines of Y signals to be recorded on individual tracks are indicated by reference numerals $A_i$, $B_i$, $C_i$ and $D_i$, respectively. Although the lines of the Y signals do not completely coincide with the lines of the corresponding C signals, this patterns is intended for compatibility with the SV format.

FIG. 8 is a table which shows the relationship between the recording positions of the Y and C signals. In the table, "First Step" indicates "simultaneous 2-ch recording executed in a first step", and "Second Step" likewise indicates "simultaneous 2-ch recording executed in a second step". As described above, in the first step, recording for tracks 1 and 2 is executed and, in the second step, recording for tracks 3 and 4 is executed.

Referring to FIG. 8, for example, in the first step, $Y(A_i)$ and $C_R(A_i)/C_B(A_i)$ are recorded on the first rack. $Y(A_i)$ indicates a Y signal consisting of a sequence of Y sampled values along the line $A_i$ shown in FIG. 7(a) and $C_R(A /C_B(A_i)$ indicates a color-difference line-sequential signal which is formed by a $C_R$ signal consisting of a sequence of $C_R$ sampled values along the line $A_i$ shown in FIG. 7(b) and a $C_B$ signal consisting of a sequence of $C_B$ sampled values along the line $B_i$ shown in FIG. 7(c). $C_R(A_i)/C_B(A_i)$ starts with a $C_R$ signal. In FIG. 8, imaging-section outputs $Y_1$, $Y_2$, R, B are signals which are simultaneously output from the imaging section of a CHSV camera, which will be described later.

The following is an explanation of the construction of the CHSV camera (a device constituted by an imaging section and a recording section).

The CHSV camera shown in FIG. 9 is, as described above, arranged to record image signals for one picture by continuously performing simultaneous 2-ch recording twice. In the first step shown in FIG. 8, the following process is performed. Y and C signals are input to each of SV recording processing circuits 826 and 827. Each of these circuits 826 and 827 effects predetermined processes such as emphasis, frequency modulation and the like on the input Y and C signals, then frequency-multiplexes the Y and C signals thus processed, and then outputs the frequency-multiplexed signal. Adders 828 and 829 add sine-wave signals, as reference signal for TBC (time base correction) in reproduction, to the output signals from the corresponding SV recording processing circuits 826 and 827 (The frequency of the sine-wave signal is 2.5 MHz or near (2.5 MHz corresponds to the gap between FM-Y and FM-C as shown in FIG. 5)). The signals output from the adders 828 and 829 are amplified by recording amplifiers 830 and 831, respectively. The resulting signals for two channels are simultaneously recorded on predetermined tracks of a magnetic disc 834 by 2-ch heads 832 and 833, respectively. In the second step, after the 2-ch heads 832 and 833 have been moved, recording is performed in a manner similar to that explained in the above first step.

The imaging section 801 shown in FIG. 9 is explained below.

FIG. 10 is a partial schematic view showing the construction of a color filter assembly for use with a single solid-state image sensor which constitutes the imaging section 801. As shown in FIG. 10, the color filter assembly consists of Y (chrominance) filters which are arranged in checkered form and the remaining R and B filters which are arranged in line-sequential form.

FIG. 11 is a view showing an example of the construction of the imaging section 801 which includes a solid-state imaging device provided with the color filter assembly shown in FIG. 10.

Referring to FIG. 11, the imaging section 801 includes a solid-state image sensor 1301 having the color filter assembly shown in FIG. 10 and sample-and-hold circuits 1302 to 1305. The solid-state image sensor 1301 has pixels of the order of 1300 pixels × 1000 pixels and an arrangement capable of simultaneously reading out signals for two adjacent horizontal lines every other two lines.

In FIG. 11, of the simultaneously read signals for two lines, the Y signal ($Y_1$) of the upper line is output to a signal line 0-1, the Y signal ($Y_2$) of the lower line to a signal line 0-3, an R signal to a signal line 0-2, and a B signal to a signal line 0-4.

The sample-and-hold circuits 1302 to 1305 sample, hold and output the Y signal ($Y_1$), the Y signal ($Y_2$), the R signal and the B signal at predetermined timings, respectively.

FIG. 12 is a schematic view showing a specific example of a solid-state image sensor having the aforesaid arrangement capable of simultaneously reading out signals for two adjacent horizontal lines every other two lines, and the illustrated solid-state image sensor is made from a MOS type solid-state image sensor.

The MOS type solid-state image sensor of FIG. 12 is of a TSL (transversal signal line) type which is well known.

Since, even in the CHSV system, the MOS type solid-state image sensor shown in FIG. 12 allows signals to be read in horizontal order, it is possible to provide the effect of suppressing smear or the like.

Furthermore, since the signal-reading operation of the MOS type solid-state image sensor is based on an X-Y address method, it is possible to simultaneously read two lines of signals as described above. For the sake of simplicity, no detailed description is given of such a signal-reading operation.

The following is an explanation, referring to FIG. 9, of the signal processing in which the imaging section 801 is driven to output the $Y_1$, $Y_2$, R and B signals by an imaging-section driving circuit 808 in synchronism with a synchronizing signal output from a clock generator 813, and those signals are input to the SV recording processing circuits 826 and 827. The signal processing operations associated with Y and C signals are separately explained in that order.

To begin with, a signal processing operation for the Y signal is explained. The $Y_1$ and $Y_2$ signals output from the imaging section 801 (refer to FIG. 8 for the details of $Y_1$ and $Y_2$) are supplied to adders 814 and 816, respectively. The adders 814 and 816 add, to the respective $Y_1$ and $Y_2$ signals, phase reference signals output from a phase reference signal generator 818. Such phase reference signal provides a phase reference for re-sampling operation during reproduction, as will be explained later. One phase reference signal may be inserted every 1H period (horizontal synchronizing period) or every 1V period (vertical synchronizing period). FIG. 13 shows an example in which one phase reference signal is inserted during every 1H period. As shown in FIG. 13, the phase reference signal is a three-level signal, and R indicates a phase reference point.

The $Y_1$ and $Y_2$ signals, to which such phase reference signals have been added by the respective adders 814 and 816, are respectively passed through low-pass filters (LPFs) 802 and 805 each of which transmits a frequency band of 6 MHz. The signals output from the LPFs 802 and 805 are passed through gamma correction circuits ($\gamma_Y$) 821 and 823 and input to the SV recording processing circuits 826 and 827, respectively.

$\gamma_Y$'s 821 and 823 serve as $\gamma$ correction circuits for the corresponding transfer paths and are inserted for the purposes of improving the S/N ratio of a dark portion of a chrominance signal, maintaining compatibility with the conventional SV format, and so on.

Then, the signal processing operation for the C signal is explained. The R and B signals output from the imaging section 801 (refer to FIG. 8 for the details of R and B) are respectively passed through LPFs 804 and 807 each of which transmits a frequency band of 1 MHz, and are input to switch circuits $S_1$ and $S_2$. The switch circuits $S_1$ and $S_2$ operate to switch every 1H period, thereby providing color line-sequential signals R/B (output from $S_1$) and B/R (output from $S_2$).

A subtracter 809 subtracts the signal $Y_1$ output from LPF 803 having a transmission frequency band of 1 MHz from the output signal from the switch circuit $S_1$, while a subtracter 810 subtracts the signal $Y_2$ output from LPF 806 having a transmission frequency band of 1 MHz from the output signal from the switch circuit $S_2$. A color-difference line-sequential signal $C_R/C_B$ is output from the subtracter 809 and a color-difference line-sequential signal $C_B/C_R$ from the subtracter 810.

The color-difference line-sequential signal $C_R/C_B$ and the color-difference line-sequential signal $C_B/C_R$ are sampled by respective sample-and-hold circuits 811 and 812, thereby providing the sample patterns $C_R$ and $C_B$ shown in FIGS. 7(b) and 7(c). The sampled signals are supplied to adders 815 and 817, respectively. Sampling clocks are supplied from the clock generator 813.

In the respective adders 815 and 817, phase reference signals are added to the sampled signals as in the case of the Y signal. (However, a phase reference point for the C signal does not have to coincide with the phase reference position for the Y signal.)

The signals output from the adders 815 and 817 are input to the SV recording processing circuits 826 and 827 through LPFs 819 and 820 and gamma correction circuits ($\gamma c$) 822 and 824, respectively.

The following is an explanation of the construction of a CHSV reproducing apparatus.

FIG. 14 is a block diagram showing the construction of the CHSV reproducing apparatus.

The signal reproduced from a magnetic disc 1501 by a magnetic head 1502 is input to both an SV reproduction processing circuit 1504 and a BPF 1505 through a preamplifier 1503.

The SV reproduction processing circuit 1504 performs frequency-separation of FM-Y and FM-C signals (refer to FIG. 5) from the input reproduced signal, then applies frequency demodulation, de-emphasis and the like to each of the signals, and then outputs a reproduced Y signal and a reproduced C signal.

Reverse gamma correction circuits ($\gamma_Y^{-1}$) 1506 and ($\gamma_c^{-1}$) 1507, which follow the SV reproduction processing circuit 1504, are provided for recovering the original signal from signals which were subjected to transfer-path $\gamma_Y$ and $\gamma_C$ correction during recording, respectively. The Y signal is corrected by the reverse gamma correction circuits ($\gamma_Y^{-1}$) 1506, passed through an LPF 1508, and input to an A/D converter 15d13, while the C signal is corrected by the reverse gamma correction circuits ($\gamma_c^{-1}$) 1506, passed through an LPF 1509, and input to a variable delay circuit 1528.

The following is an explanation of a process for generating re-sampling clocks during reproduction.

Referring to FIG. 14, the BPF 1505 separates a reference signal $f_r$ for reproduction TBC from a reproduced signal. The reference signal $f_r$ is input to a PLL (Phase-Locked Loop) circuit 1526. The PLL circuit 1526 generates and outputs a clock $f_{so}$ which is phase-synchronized with the signal $f_r$ and which has a frequency equal to the frequency of a re-sampling clock for a Y signal.

A phase control circuit 1511 for a Y-signal re-sampling clock executes phase control of the re-sampling clock $f_{so}$ thus obtained, thereby outputting a Y-signal re-sampling clock $f_{s1}$, the phase of which has, as shown in FIG. 15, a predetermined relationship to the phase reference point of the aforesaid Y-signal re-sampling phase reference signal added to the reproduced Y signal.

A clock ($f_{s1}/6$) is used as a re-sampling clock for a C signal. The clock ($f_{s1}/6$) is obtained by dividing the aforesaid clock $f_{s1}$ by six by a 1/6 frequency divider 1527. The 1/6 frequency divider 1527 consists of elements such as a counter, and the count of the counter is reset by the falling edge of a synchronizing signal. The C signal output from the LPF 1509 is delay-controlled by the variable delay circuit 1528 whose delay time is controlled by a C-signal delay control signal generating circuit 1529, whereby the phase relationship between the C-signal re-sampling clock ($f_{s1}/6$) and the re-sampling phase reference point added to the C signal is rendered constant. The C signal thus processed is supplied to an A/D converter 1514.

The following is a detailed explanation of the construction of each of the PLL circuit 1526, the phase control circuit 1511 for a Y-signal re-sampling clock and the C-signal delay control signal generating circuit 1529.

FIG. 16 is a block diagram showing the construction of the PLL circuit 1526.

In a phase comparator 1601, the input reference signal $f_r$ for reproduction TBC is phase-compared with a signal obtained by dividing the clock output from a voltage controlled oscillator (VCO) 1604 by N in a 1/N frequency divider 1603. A band-pass filter (BPF) 1608 is provided for extracting the basic (sine-wave) component of the clock output from the 1/N frequency divider 1603. The clock output from VCO 1604 is divided by M by a 1/M frequency divider 1605 and output as the clock $f_{so}$.

It is assumed here that the frequency relationship $f_r = (M/N)f_{s1}$ is established between the re-sampling clock $f_{s1}$ and the TBC reference signal $f_r$.

FIG. 17 is a block diagram showing the construction of the Y-signal re-sampling clock phase control circuit 1511.

In this phase control circuit 1511, the clock $f_{so}$ obtained in the PLL circuit 1526 is passed through a variable delay circuit 1705, and the variable delay circuit 1705 is controlled so that the Y-signal re-sampling clock $f_{s1}$ bears a constant relationship with the phase reference point of the re-sampling phase reference signal added to the reproduced Y signal.

A control signal for the variable delay circuit 1705 is generated by a Y-signal re-sampling clock phase control signal generating circuit 1706 which is surrounded by dashed lines in FIG. 17.

The illustrated circuit 1706 includes a counter circuit 1707 which operates in response to the re-sampling clock $f_{s1}$. The counter circuit 1707 utilizes a synchronizing (SYNC) signal as a reset signal. As shown in FIG. 18, the counter circuit 1707 counts the clock $f_{s1}$ by utilizing the falling edge of the horizontal synchronizing signal as a reference point, and outputs pulses G1 and G2 at the timing shown in FIG. 18. The circuit 1706 also includes sample-and-hold circuits 1703 and 1704 for sampling and holding Y signals at the timings of the pulses G1 and G2, respectively.

A differential amplifier 1702 obtains the difference between the outputs from the sample-and-hold circuits 1703 and 1704. The obtained difference signal is passed through a low-pass filter (LPF) 1701 which serves as a loop filter. The signal passed through LPF 1701 is output as a phase control signal to control the delay time of the variable delay circuit 1705.

The variable delay circuit 1705 provides correct phase control in the above-described manner, whereby the re-sampling clock is output at the timing shown in part $f_{s1}*$ of FIG. 18.

The variable delay circuit 1705 may consist of, for example, a circuit in which a plurality of CMOS buffers of the type shown in FIG. 19 are connected and in which a source voltage $V_{DD}$ is controlled to vary the delay time.

FIG. 20 is a block diagram showing the construction of the C-signal delay control signal generating circuit 1529 shown in FIG. 14.

The circuit shown in FIG. 20 includes a counter circuit 2005 arranged to operate in response to the clock $f_{s1}/6$ output from 1/6 frequency divider 1527 of FIG. 14. The counter circuit 2005 utilizes the synchronizing (SYNC) signal as a reset signal. As shown in FIG. 21, the counter circuit 2005 counts the clock $f_{s1}/6$ by utilizing the falling edge of the horizontal synchronizing signal as a reference point, and outputs the pulses G1 and G2 at the timing shown in FIG. 21.

The circuit 1706 also includes sample-and-hold circuits 2003 and 2004 for sampling and holding C signals at the timings of the pulses G1 and G2, respectively.

A differential amplifier 2002 outputs the difference between the output from the sample-and-hold circuits 2003 and 2004. The obtained difference signal is passed through a low-pass filter (LPF) 2001 which serves as a loop filter. The signal passed through LPF 2001 is output as a C-signal delay control signal.

Part C* of FIG. 21 shows the C signal which is correctly delay-controlled.

A CCD delay circuit or the like may be used as the C-signal variable delay circuit 1528 shown in FIG. 14.

The method of generating re-sampling clocks in reproduction is as described above.

The respective A/D converters 1513 and 1514 of FIG. 14 perform A/D conversion of the Y signal and the c signal by utilizing the thus-generated re-sampling clocks as clocks. The Y signal and C signal thus A/D converted are written into an image memory 1515. Write addresses associated with the image memory 1515 are generated by an address generator 1517.

The CHSV reproducing apparatus shown in FIG. 14 repeats the aforesaid reproducing operation for all the four tracks (the first track to the fourth track) shown in FIGS. 6(a) and 6(b), thereby storing all the sampled values recorded in the four tracks on the magnetic disc 1501, in the image memory 1515 shown in FIG. 14.

Thereafter, an image processing circuit 1516 executes processes such as interpolation and rearrangement stored in the image memory 1515. The image processing circuit 1516 executes an LPF process for extracting a two-dimensional spatial frequency through a two-dimensional digital filter, thereby providing a low-band component $Y_L$. The image processing circuit 1516 then performs arithmetic operations on (Y-YL) to provide the high frequency component YH of the sampled-value data of the Y signal. Accordingly, four kinds of data $Y_H$, $Y_L$, $C_R$ and $C_B$ are stored in the image memory 1515.

After the above process has been completed, the respective kinds of data are read from the image memory 1515 in predetermined order at a predetermined clock rate in accordance with the read addresses specified by the address generator 1517.

Of the $Y_H$, $Y_L$, $C_R$ and $C_B$ signals read from the image memory 1515, the $Y_L$, $C_R$ and $C_B$ signals are converted into the $R_L$, $G_L$ and $B_L$ signals by a matrix circuit 1519. The $R_L$, $G_L$ and $B_L$ signals are added to the $Y_H$ signal by adders 1520, 1521 and 1522, respectively. The adders 1520, 1521 and 1522 output a $(R_L+Y_H)$ signal, a $(G_L+Y_H)$ signal and a $(B_L+Y_H)$ signal.

The respective signals output from the adders 1520, 1521 and 1522 are converted into analog signals by corresponding D/A converters 1523, 1524 and 1525, so that the R, G and B signals are output.

As described above, the CHSV system proposed by the present applicant has the following features: It is capable of recording and reproducing a high-quality still image signal of the order of 1000 pixels × 1000 pixels by using four tracks each of which conforms to the SV format and the magnetic disc recorded by the CHSV system can be reproduced even with a reproducing apparatus which conforms to the conventional SV format.

However, well-known ID signals, which are prescribed in the conventional SV format and which are recorded together with image signals on respective tracks, contain no information for use in discriminating between tracks recorded on the basis of the above CHSV system and tracks recorded on the basis of the conventional SV format. Accordingly, if a magnetic disc, recorded on the basis of the conventional SV format by an arbitrary recording apparatus, is reproduced with a reproducing apparatus based on the above CHSV format, various kinds of malfunction will take place; for example, different images may be overlapped on a display.

Accordingly, to realize a reproducing apparatus which conforms to the aforesaid CHSV system, it is necessary to prevent the aforementioned malfunction by determining whether tracks on a magnetic disc loaded in the apparatus are those recorded on the basis of the aforesaid CHSV format or those recorded on the basis of the conventional SV format.

SUMMARY OF THE INVENTION

It is therefore an object of the present invention to provide an image signal recording and reproducing system capable of solving the above-described problems.

It is another object of the present invention to provide an image signal recording and reproducing system capable of reproducing an image signal in a correct reproduction format corresponding to the recording format of the image signal.

To achieve the above objects, in accordance with one aspect of the present invention, there is provided an image signal reproducing apparatus for reproducing an image signal from a recording medium on which the image signal is recorded in a recording format selected between a first recording format for recording a reference signal for time base correction together with the image signal and a second recording format for recording the image signal without the reference signal for time base correction. The apparatus is provided with detection means for detecting whether or not the reference signal for time base correction is present in a signal reproduced from the recording medium, and reproduction processing means for processing and reproducing the signal reproduced from the recording medium on the basis of a reproduction format selected between a first reproduction format corresponding to the first recording format and a second reproduction format corresponding to the second recording format in accordance with a result of detection made by the detection means.

The above and other objects, features and advantages of the present invention will become apparent from the following detailed description of embodiments of the present invention, taken in conjunction with the accompanying drawings.

BRIEF DESCRIPTION OF THE DRAWINGS

FIG. 1 is a schematic diagram which serves to illustrate a system for analog transfer of sampled values;

FIGS. 2(a) to 2(f) are waveform diagrams showing the principle of the analog transfer of sampled values;

FIG. 4 is a view showing sample points for a Y signal to be recorded on a recording medium;

FIGS. 6(a) and 6(b) are views showing recording-track patterns on a recording medium;

FIG. 8 is a table showing the positional relationships between the recording tracks on a recording medium on which Y and C signals are recorded;

FIG. 13 is a diagram showing the waveform of a luminance signal to which a phase reference signal is added;

DETAILED DESCRIPTION OF THE PREFERRED EMBODIMENTS

Preferred embodiments of the present invention will be described below with reference to the accompanying drawings.

Figure 22:
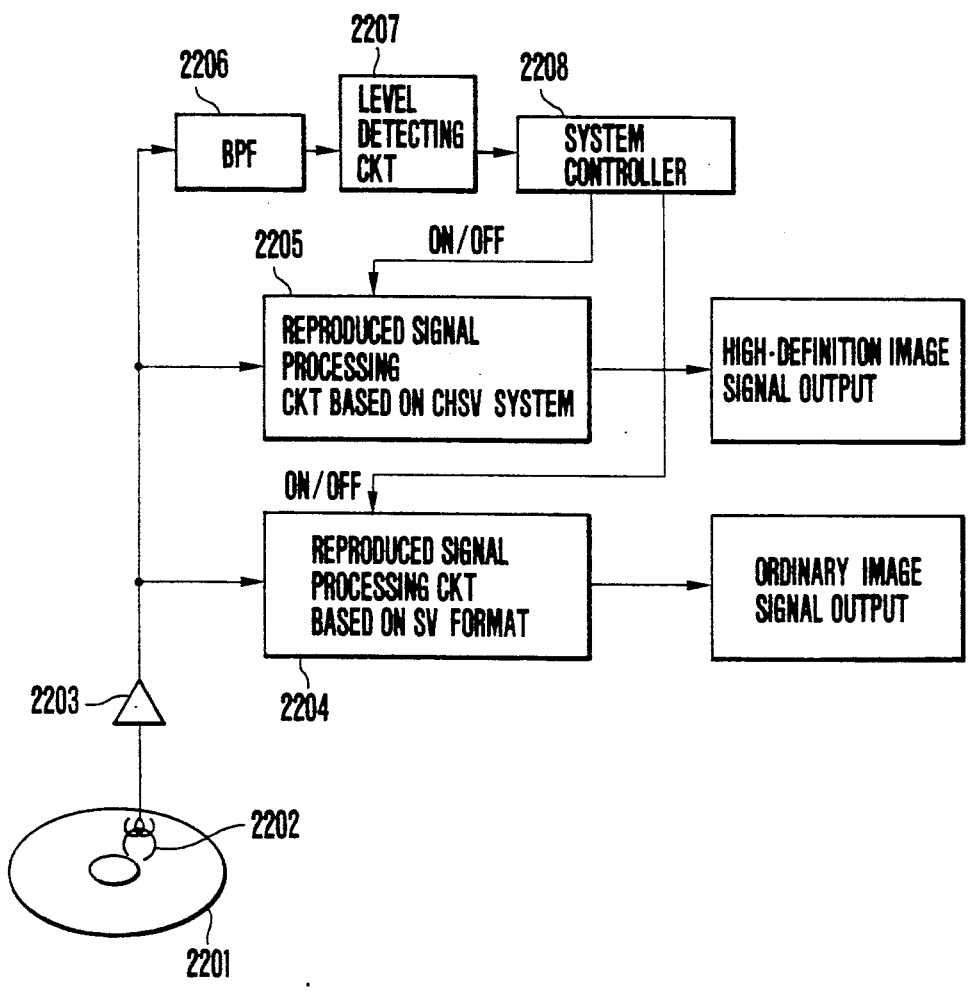
FIG. 22 is a block diagram showing the construction of an image signal reproducing apparatus according to one embodiment of the present invention.
Figure 23:
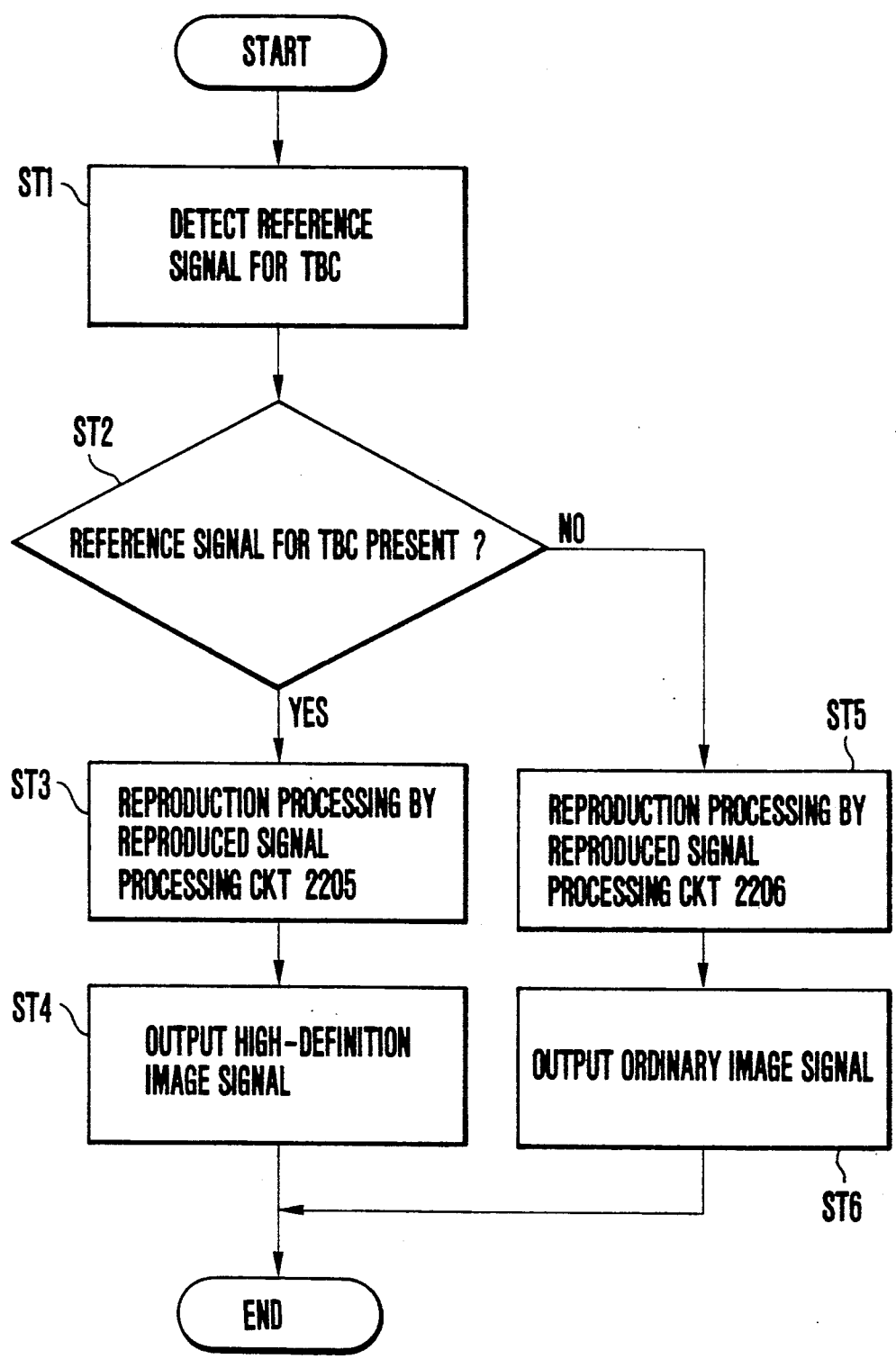
FIG. 23 is a flow chart showing the operational flow of the apparatus shown in FIG. 22.

FIG. 22 is a block diagram showing an image signal reproducing apparatus according to one embodiment of the present invention. FIG. 23 is a flow chart showing the flow of the operation of the apparatus of FIG. 22.

As illustrated, the apparatus includes a magnetic disc 2201, a magnetic head 2202, a reproducing preamplifier 2203 for amplifying an image signal reproduced from the magnetic disc 2201 by the magnetic head 2202, a reproduced signal processing circuit 2204 based on the SV format, a reproduced signal processing circuit 2205 based on the CHSV system, a band-pass filter (BPF) 2206, a level detecting circuit 2207 and a system controller 2208.

The operation of the apparatus of FIG. 22 will be explained with reference to FIGS. 22 and 23.

Referring to FIG. 22, a signal, which is reproduced from the magnetic disc 2201 which is being rotated at a predetermined rotational speed by a motor (not shown), is amplified by the reproducing preamplifier 2203 and supplied to the BPF 2206. The BPF 2206 extracts a signal near to the frequency band of a TBC reference signal from the reproduced signal amplified by the reproducing preamplifier 2203, and the level detecting circuit 2207 detects whether the level of the extracted signal has reached a predetermined level, thereby making a decision as to the presence or absence of a TBC reference signal (Step ST1 of the FIG. 23). The result of this decision is supplied to the system controller 2208. If the level detecting circuit 2207 determines that a TBC reference signal is present (Step ST2 of FIG. 23), the system controller 2208 actuates the reproduced signal processing circuit 2205 based on the CHSV system. The reproduced signal processing circuit 2205 executes a reproduction operation to output a high-definition image signal (Steps ST3, ST4 of FIG. 23). If the level detecting circuit 2207 determines that any TBC reference signal is absent (Step ST2 of FIG. 23), the system controller 2208 actuates the reproduced signal processing circuit 2204 based on the SV format. The reproduced signal processing circuit 2204 executes a reproduction operation to output an image signal based on an ordinary format (Steps ST5, ST6 of FIG. 23).

Figure 3:
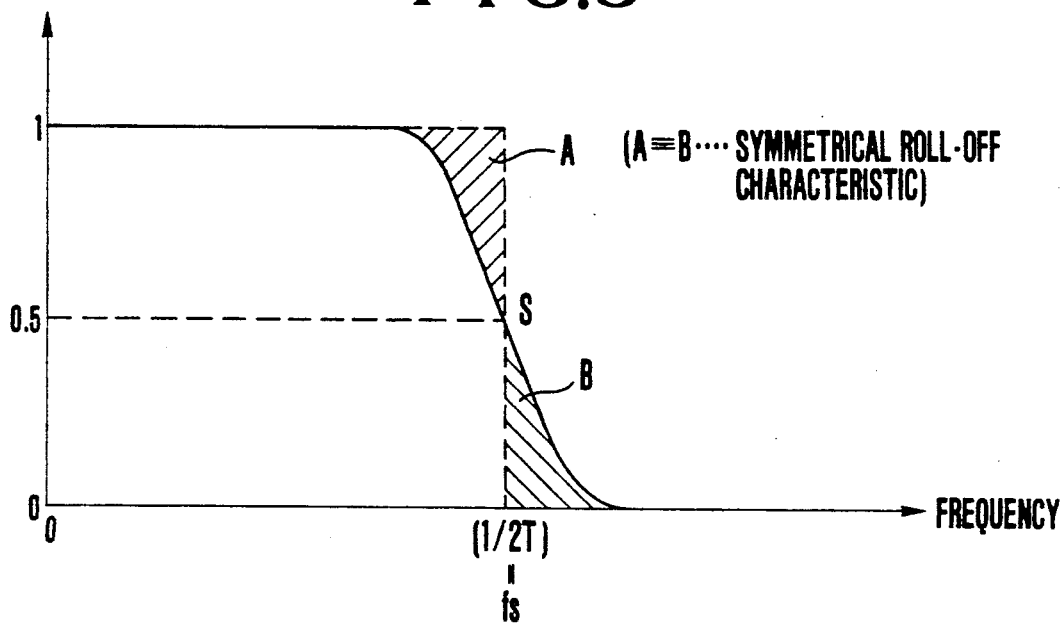
FIG. 3 is a graph showing transfer path characteristics in the analog transfer of sampled values.
Figure 5:
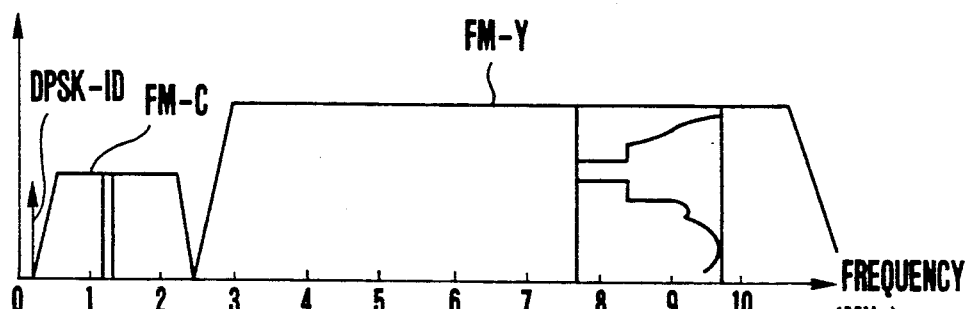
FIG. 5 is a view showing the frequency allocation of a recorded signal based on an SV format.
Figure 7A:
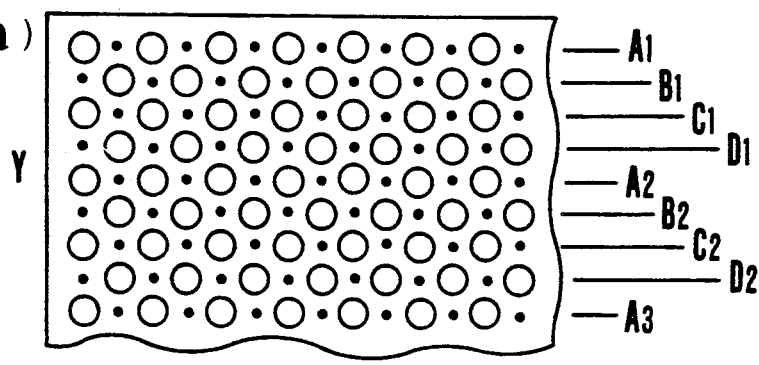
FIGS. 7(a) and 7(c) are views showing sample points for Y and C signals to be recorded on a recording medium.
Figure 7B:
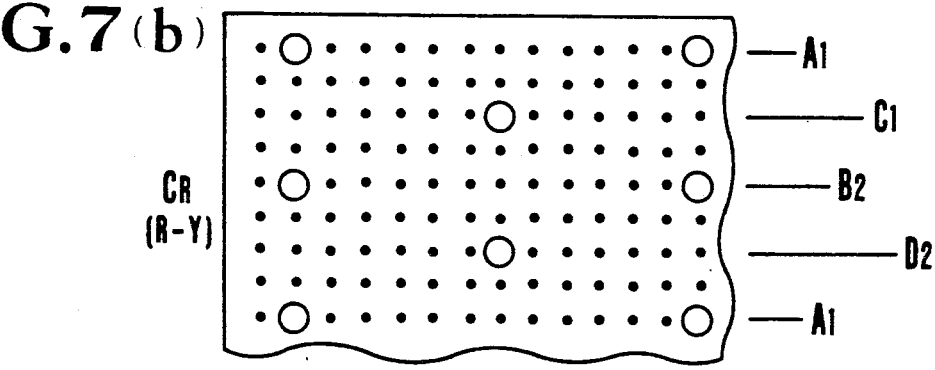
Figure 7C:
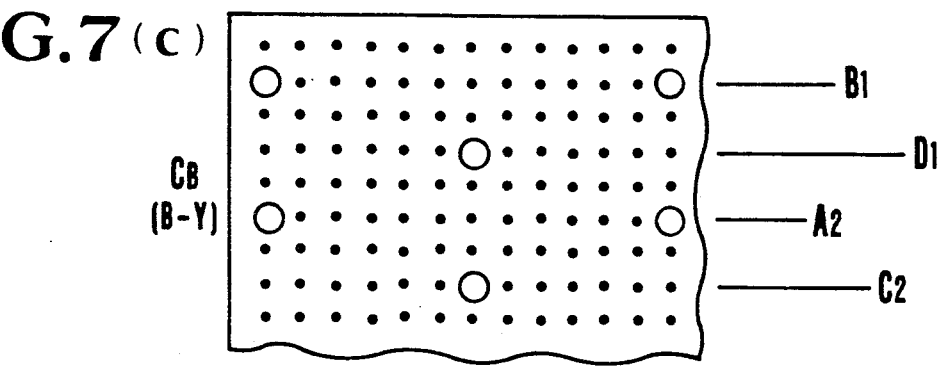
Figure 9:
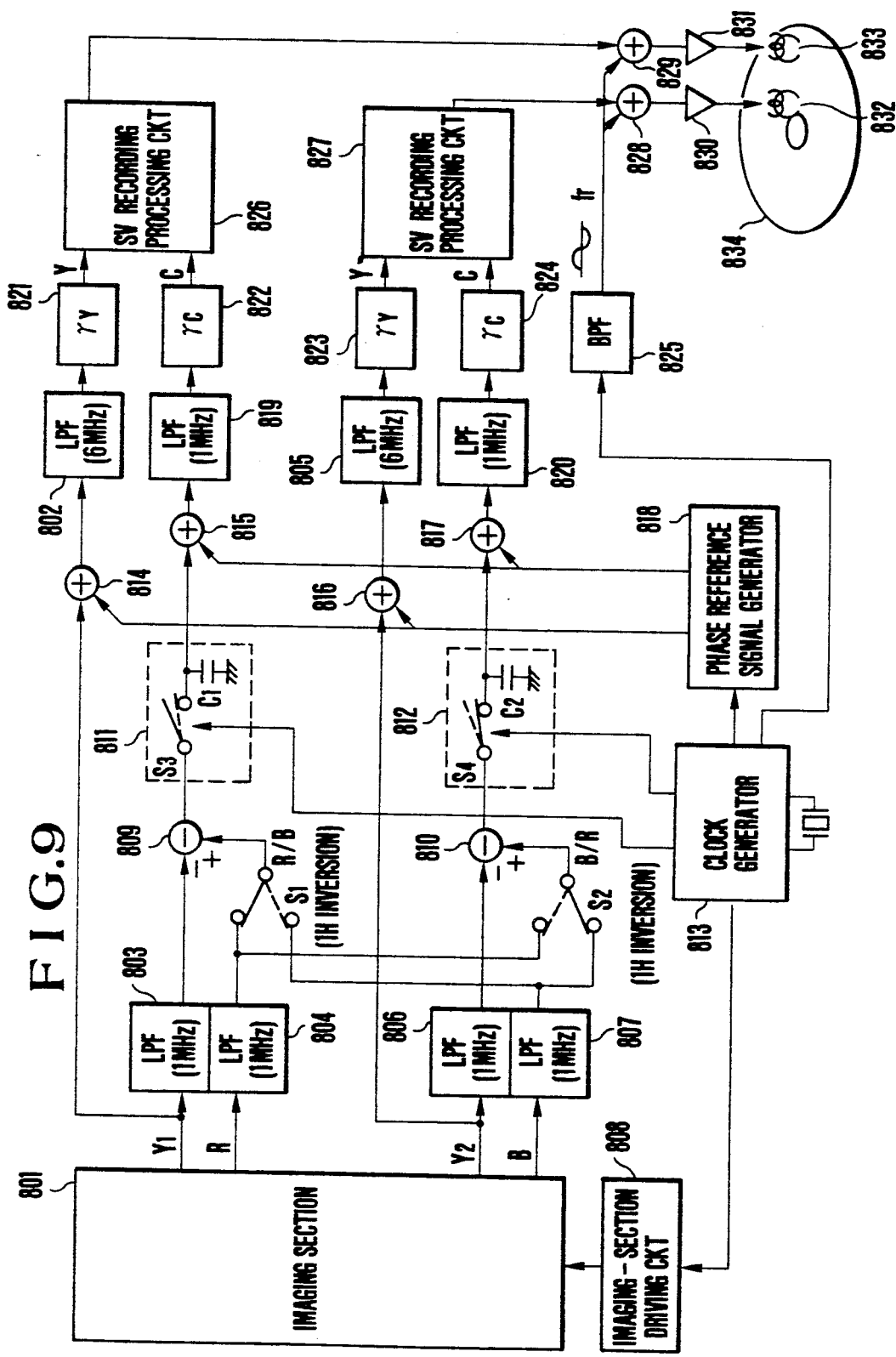
FIG. 9 is a block diagram showing the primary construction of the recording system of a CHSV camera.
Figure 10:
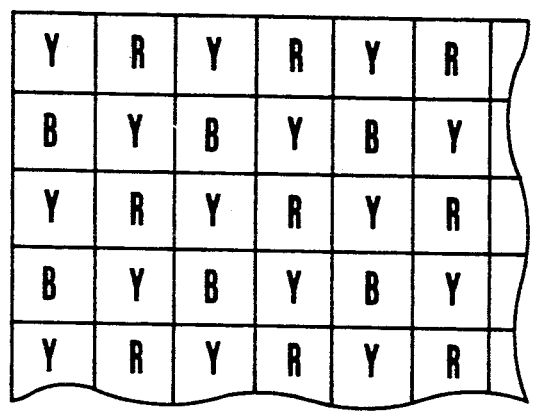
FIG. 10 is a schematic view showing an example of the arrangement of color filters when an imaging section is formed by a single solid-state image sensor.
Figure 11:
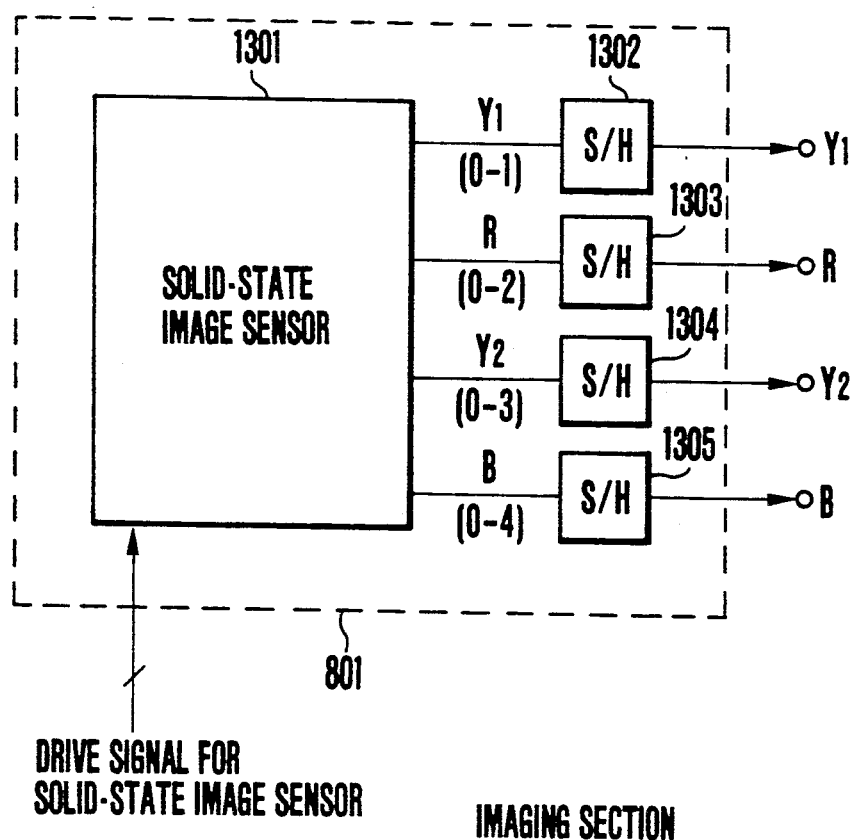
FIG. 11 is a block diagram showing the construction of an imaging section which includes a color filter assembly having the arrangement shown in FIG. 10.
Figure 12:
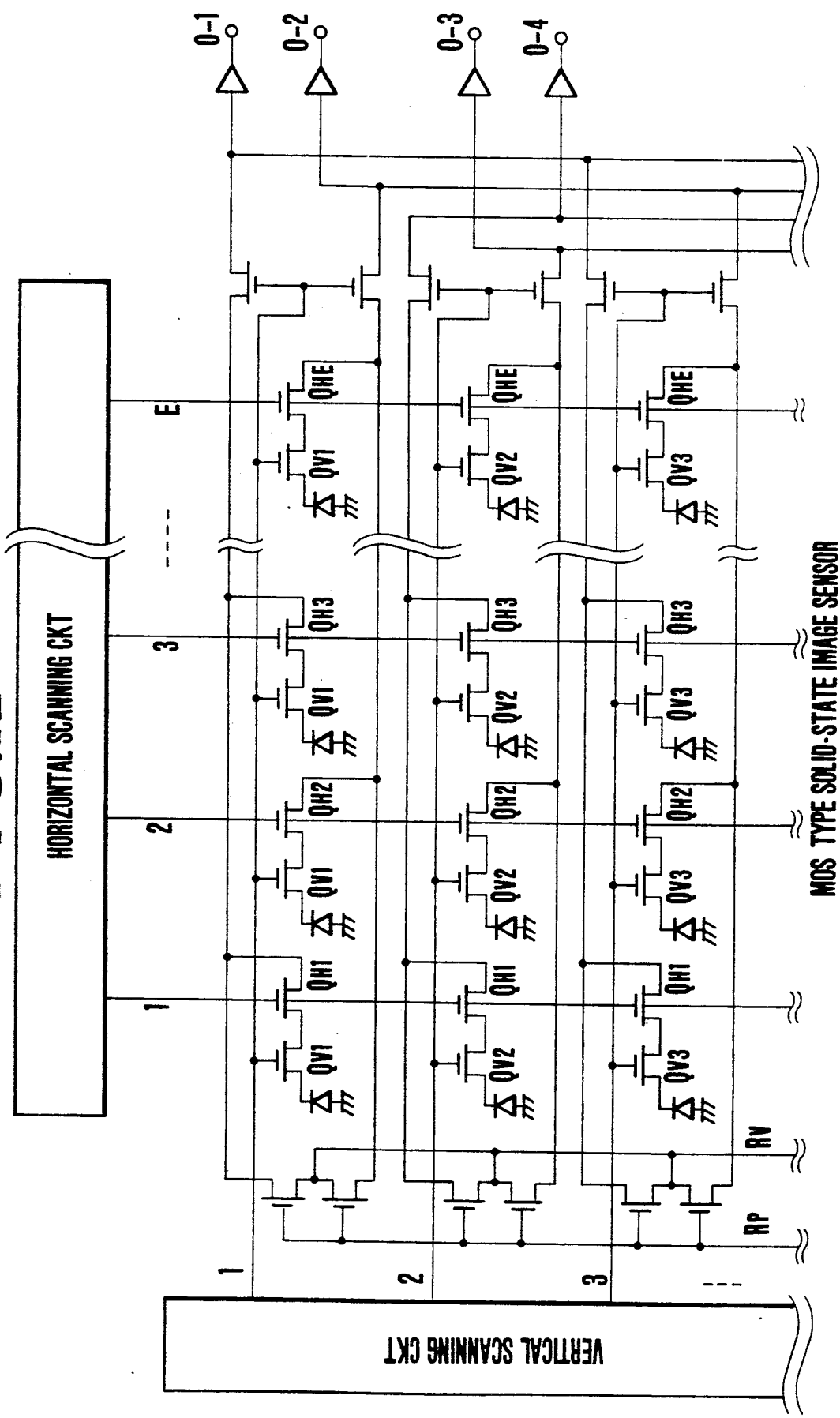
FIG. 12 is a circuit diagram showing a MOS type solid-state image sensor capable of simultaneously reading signals for two adjacent lines every other two
Figure 14:
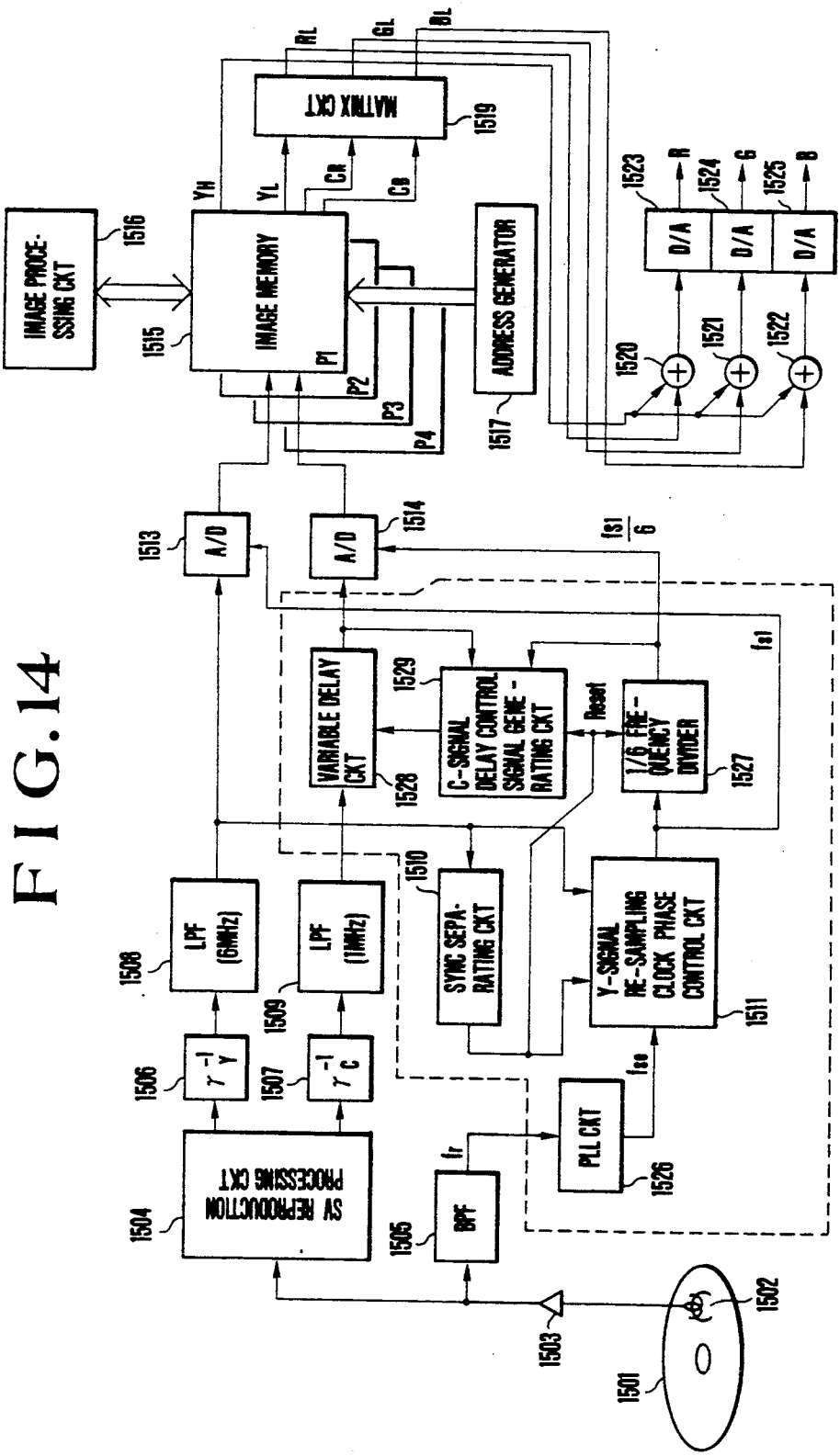
FIG. 14 is a block diagram showing the construction of a CHSV reproducing apparatus.
Figure 15:
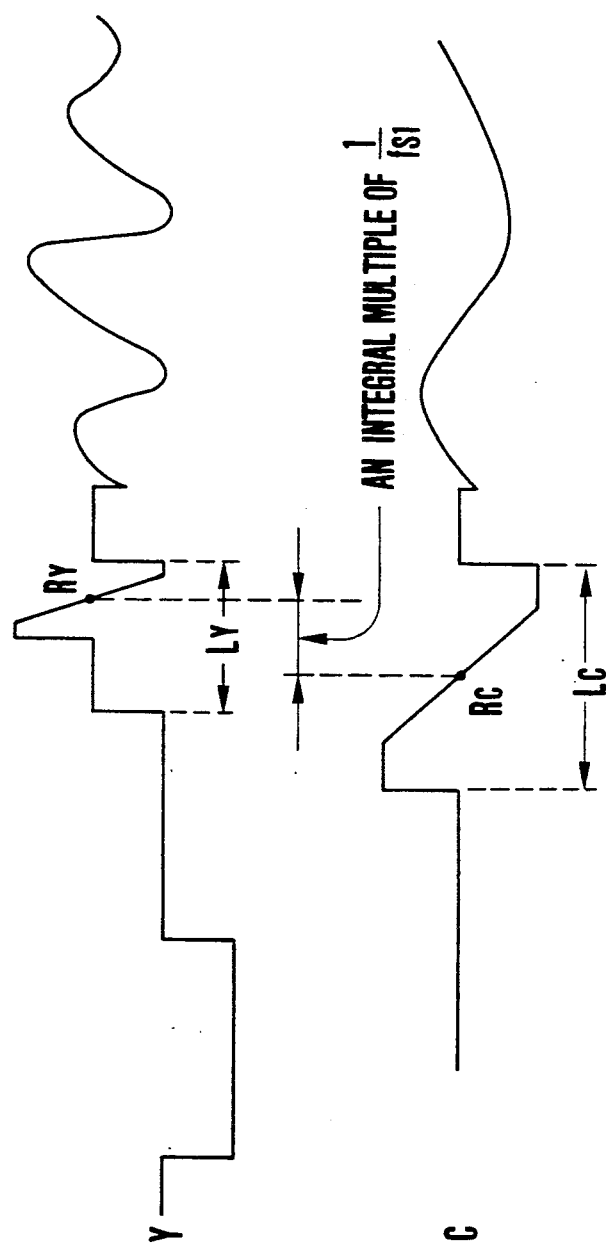
FIG. 15 is a diagram showing the relationship between a phase reference signal for a Y signal and that for a C signal.
Figure 16:
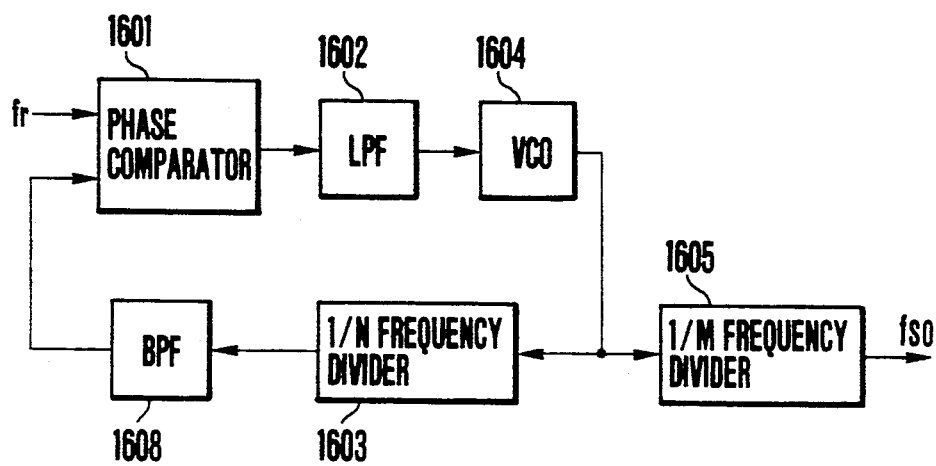
FIG. 16 is a block diagram showing the construction of a PLL circuit.
Figure 17:
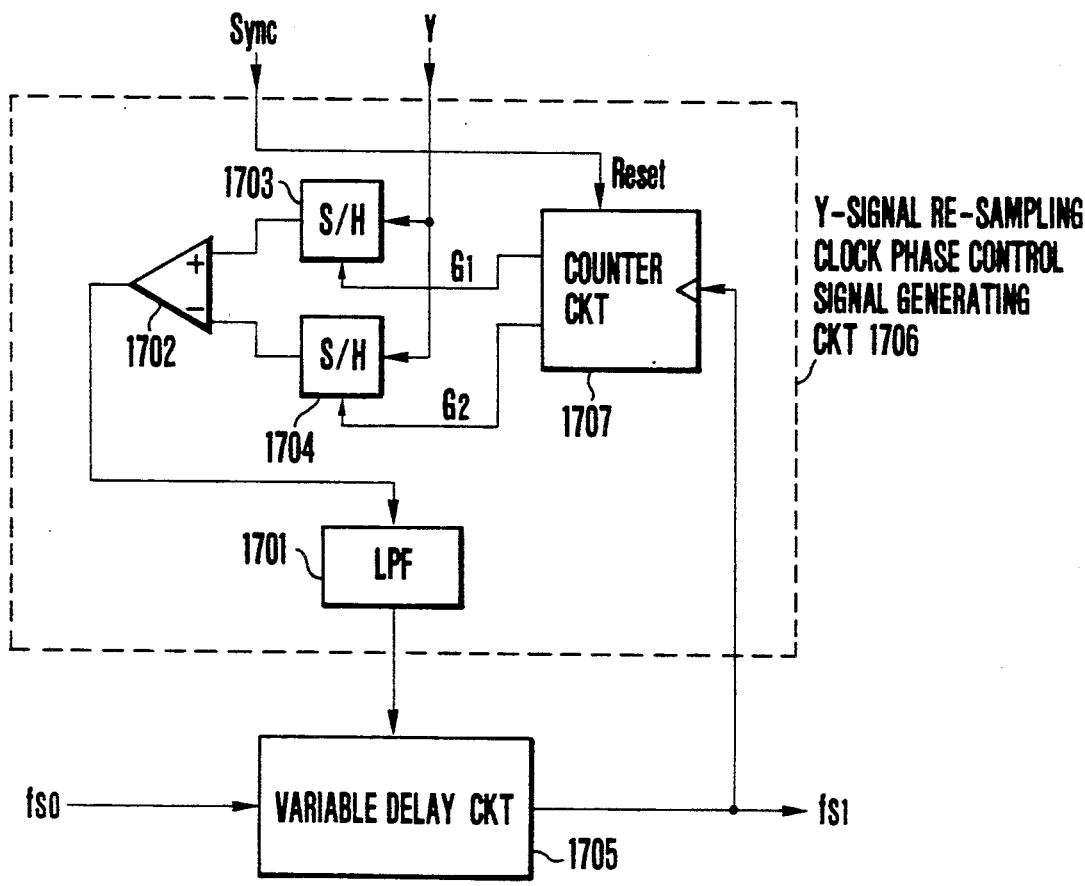
FIG. 17 is a view showing the construction of a Y-signal re-sampling clock phase control circuit.
Figure 18:
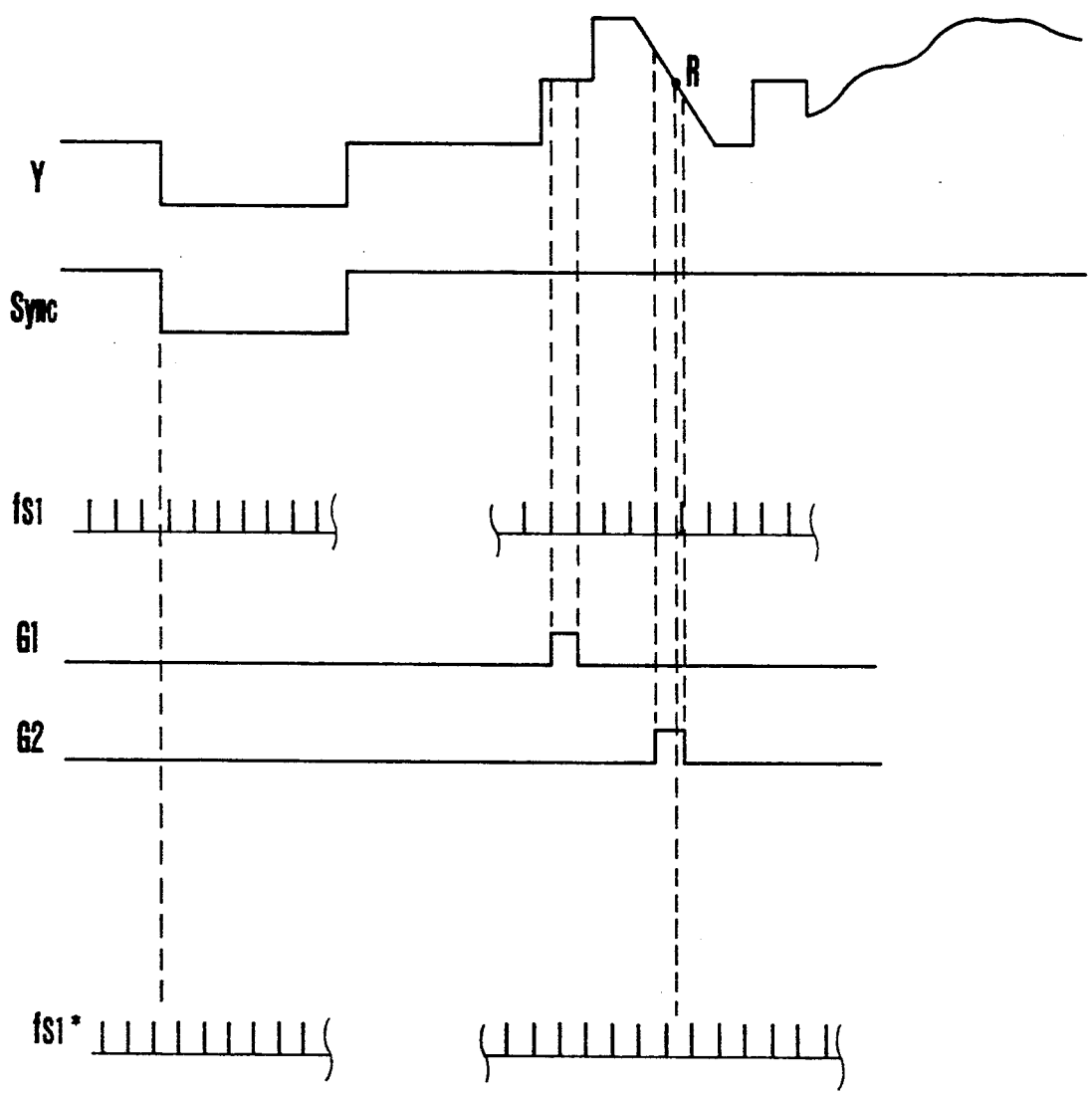
FIG. 18 is an operational timing chart of the Y-signal re-sampling clock phase control circuit.
Figure 19:
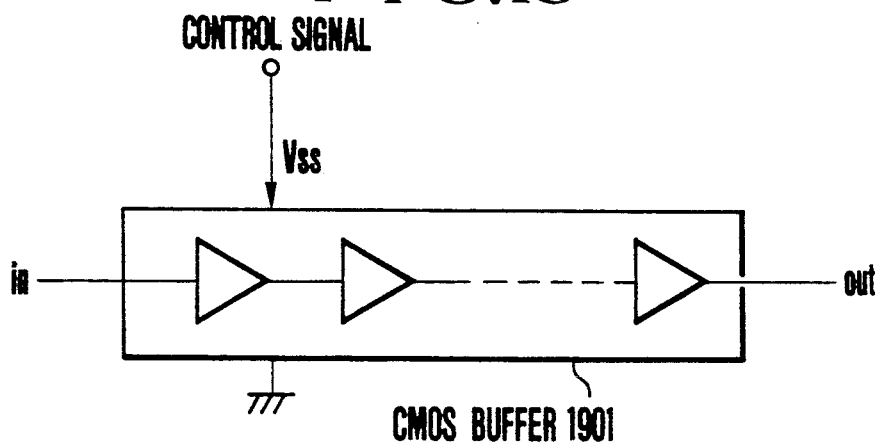
FIG. 19 is a schematic diagram showing the construction of a variable delay circuit.
Figure 20:
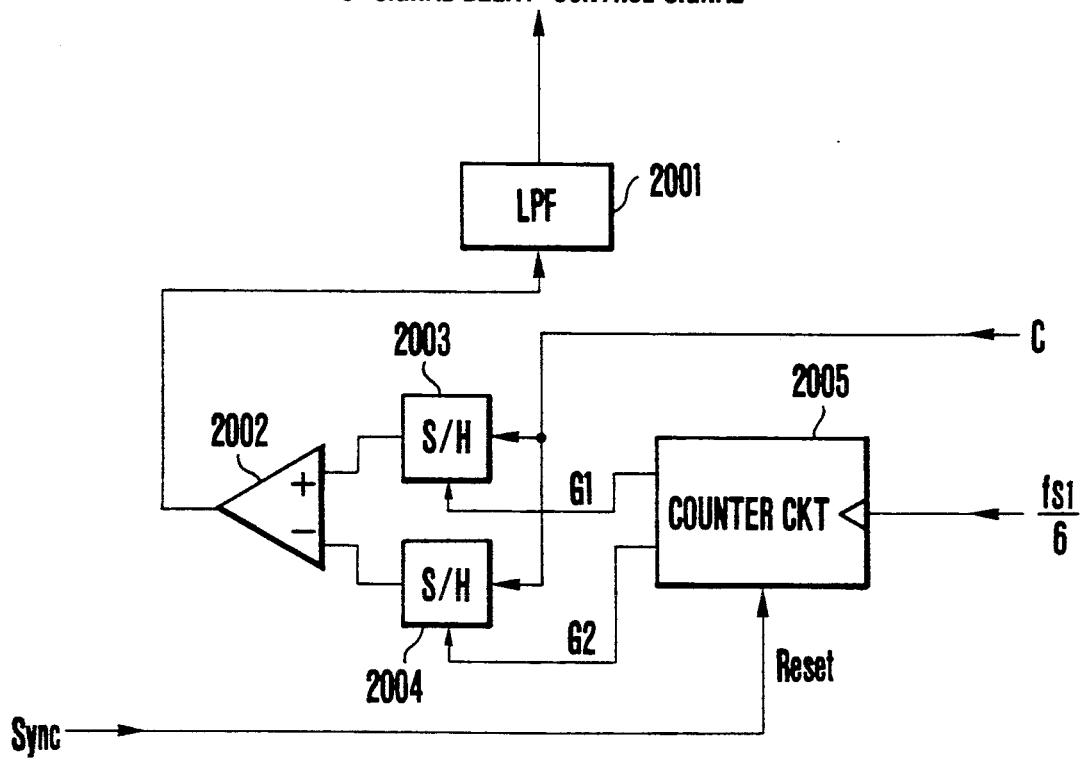
FIG. 20 is a block diagram showing the construction of a C-signal delay control signal generating circuit.
Figure 21:
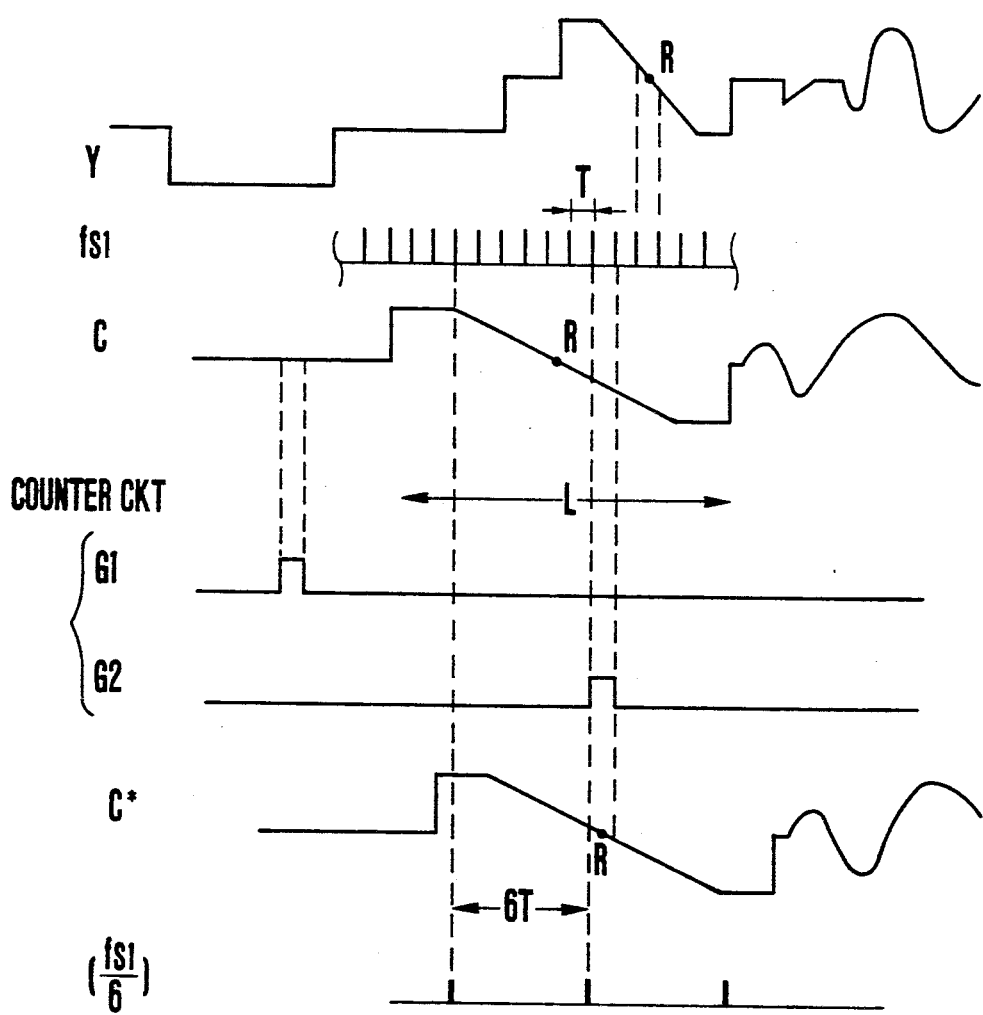
FIG. 21 is a timing chart showing individual signals in the construction shown in FIG. 20.
Figure 24:
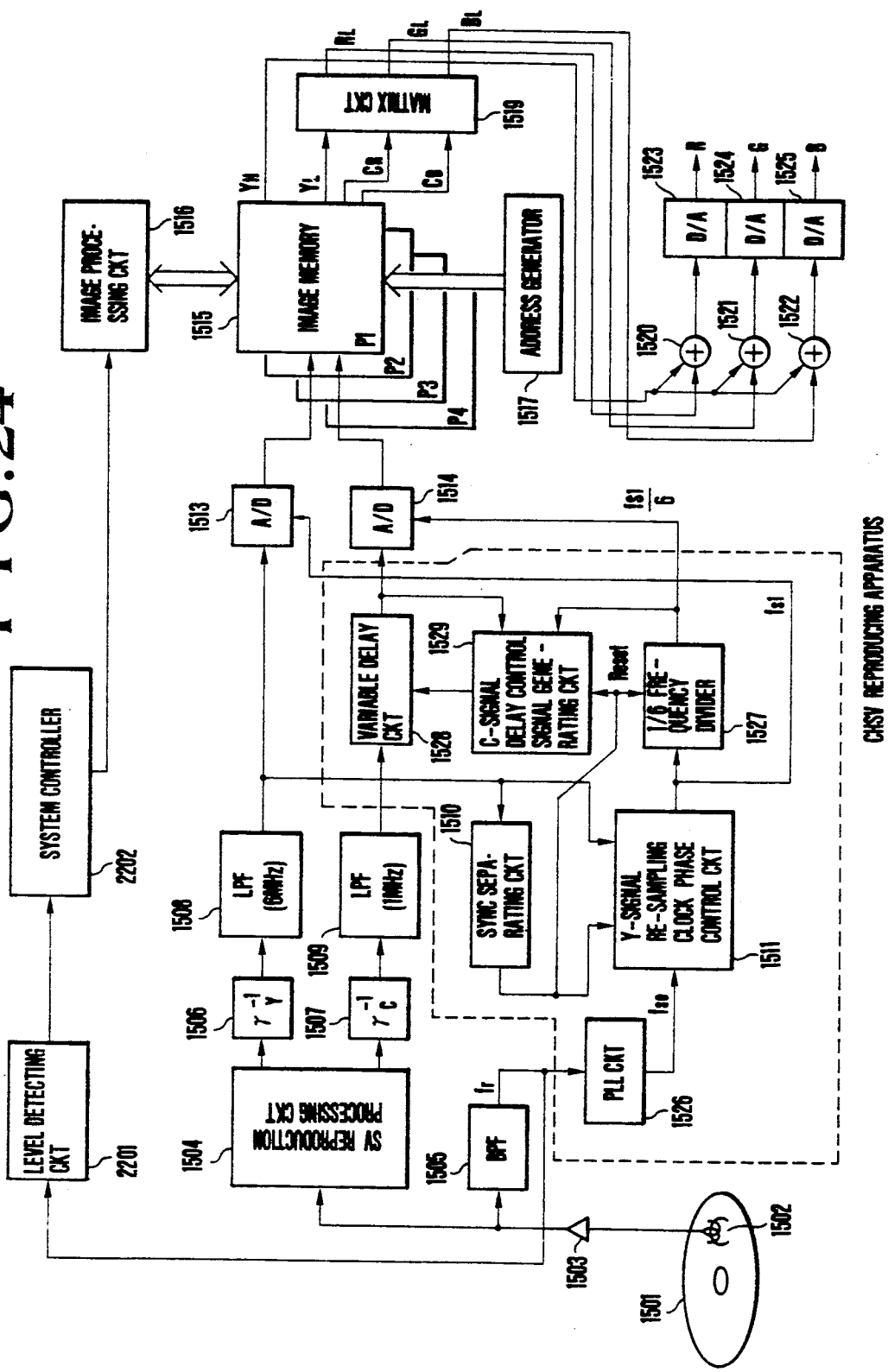
FIG. 24 is a block diagram showing the construction of an image signal reproducing apparatus according to another embodiment of the present invention.

FIG. 24 is a block diagram showing the construction of a reproducing apparatus according to another embodiment of the present invention. The same reference numerals are used to denote elements having the same functions as those used in the reproducing apparatus shown in FIG. 14 mentioned previously, and a detailed description thereof is omitted.

As shown in FIG. 24, the BPF 1505 and the level detecting circuit 2201 detect whether or not a TBC reference signal is present in a signal reproduced from the magnetic disc 1501, and the system controller 2202 controls the interpolation process executed by the image processing circuit 1516 in accordance with the detection result.

More specifically, if a TBC reference signal is present, the image processing circuit 1516 executes an interpolation process based on the CHSV system, while, if a TBC reference signal is absent, the image processing circuit 1516 executes interpolation so that an image signal based on the SV format is made substantially equal in resolution to a high-definition image signal based on the CHSV system. These interpolation processes are switched by the system controller 2202.

As is apparent from the foregoing, the embodiments of the present invention make it possible to easily identify the recording format of an image signal recorded in a track on a recording medium and reproduce the image signal in a correct reproduction format based on the recording format thereof.

What is claimed is:

1. An image signal reproducing apparatus for reproducing an image signal from a recording medium on which the image signal is recorded in a recording mode selected between a first recording mode in which a first image signal corresponding to a first television signal having a first number of scanning lines and including a composite synchronizing signal is multiplexed with a time-base correcting reference signal and then recorded on the recording medium and a second recording mode in which a second image signal corresponding to a second television signal having a second number of scanning lines, said second number of scanning lines being fewer than said first number of scanning lines, and including a composite synchronizing signal is recorded on the recording medium, without multiplexing with said time-base correcting reference signal, comprising:

(A) reproducing means for reproducing the signal recorded on said recording medium and outputting the reproduced signal;

(B) detection means for detecting whether or not said time-base correcting reference signal exists in the signal outputted from said reproducing means; and (C) reproduction processing means for processing the signal outputted from said reproducing means on the basis of a first reproduction mode corresponding to said first recording mode in which a time-base correcting processing is effected by using said time-base correcting reference signal or a second reproducing mode corresponding to said second recording mode in which the time-base correcting processing by using said time-base correcting reference signal is not effected, in accordance with a result of detection effected by said detection means.

2. An image signal reproducing apparatus according to claim 1, wherein said reproduction processing means includes time-base correcting means for correcting a time base of the signal outputted from said reproducing means by using said time-base correcting reference signal, when said time-base correcting reference signal is included in the signal outputted from said reproducing means.

3. An image signal reproducing apparatus according to claim 2, wherein said time-base correcting means includes:

(A) clock-signal generating means, arranged to receive said time-base correcting reference signal and to generate a clock signal which is phase-synchronized with the received time-base correcting reference signal;

(B) conversion means, arranged to to receive the signal outputted from said reproducing means and to convert the received signal into a digital signal in synchronism with the clock signal generated by said clock-signal generating means and output the converted signal; and (C) memory means for storing the digital signal converted by said conversion means.

4. An image signal reproducing apparatus according to claim 1, wherein said reference signal for time base correction includes a signal of single frequency.

5. An image signal reproducing apparatus according to claim 4, wherein said detection means includes:
 (A) signal separating means for separating, from the signal outputted from said reproducing means, a signal of a frequency band which contains said time-base correcting reference signal; and
 (B) level detecting means for detecting whether a level of the signal separated by said signal separating means is high or low compound to a predetermined level.

* * * * *

UNITED STATES PATENT AND TRADEMARK OFFICE
CERTIFICATE OF CORRECTION

PATENT NO. : 5,075,802
DATED : December 24, 1991
INVENTOR(S) : Kazuhito Ohashi

It is certified that error appears in the above-identified patent and that said Letters Patent is hereby corrected as shown below:

Col. 3, line 59.  Change "this patterns is" to -- these patterns are --

Col. 4, line 2.  Change "rack" to -- track --

Col. 4, line 32.  After "827" insert -- . --

Col. 14, line 5.  Change "compound" to -- compared --

Signed and Sealed this

Twentieth Day of April, 1993

Attest:

MICHAEL K. KIRK

*Attesting Officer*    Acting Commissioner of Patents and Trademarks